(No Model.)
G. HAYNES, Jr.
TREADLE FOR BICYCLES.
No. 402,926. Patented May 7, 1889.
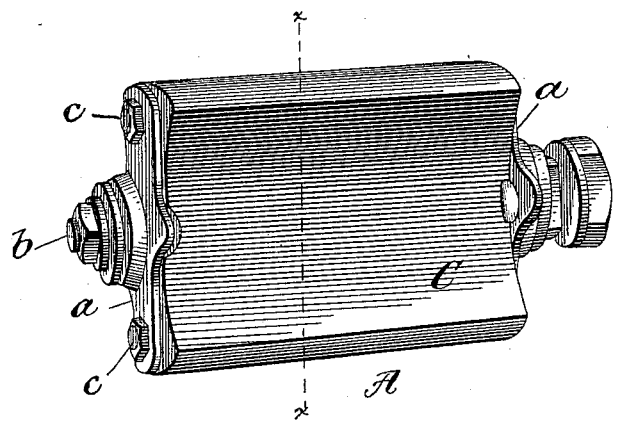
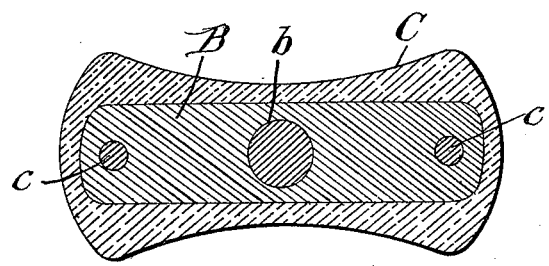
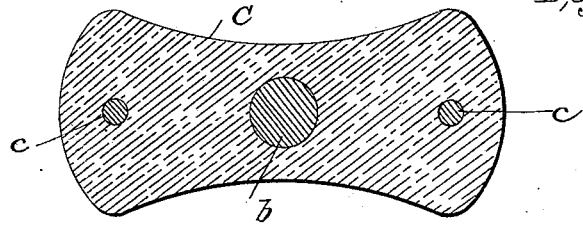
WITNESSES
Edwin L. Yewell.
B. C. Rock.
Gideon Haynes, Jr.
INVENTOR
By
Attorney.

UNITED STATES PATENT OFFICE.

GIDEON HAYNES, JR., OF HINGHAM, ASSIGNOR TO THE SPRINGFIELD BICYCLE MANUFACTURING COMPANY, OF BOSTON, MASSACHUSETTS.

TREADLE FOR BICYCLES.

SPECIFICATION forming part of Letters Patent No. 402,926, dated May 7, 1889.

Application filed January 20, 1888. Serial No. 261,344. (No model.)

*To all whom it may concern:*

Be it known that I, GIDEON HAYNES, Jr., a citizen of the United States, residing at Hingham, Plymouth county, Massachusetts, have invented new and useful Improvements in Treadles for Bicycles, of which the following is a specification.

This invention relates to certain new and useful improvements in treadles for bicycles and like machines; and it consists substantially in such features thereof as will hereinafter be more particularly described or pointed out.

The object of the invention is to supply a treadle for bicycles and like machines which shall give an easier, more natural, and wider bearing-surface to the foot than is obtained from many former inventions of a like character, whereby the machine is made less tedious to operate over long distances.

Further, the invention has for its object to supply a treadle for bicycles of a construction by which a neat and even conformity is had to the shape of the ball of the foot, and one which will always be in position to receive and hold the foot of the rider while working the machine.

Finally, the invention has for its object to provide a treadle possessing all the advantages of lightness, durability, and cheapness in the cost of manufacture, all as will more fully hereinafter appear, when taken in connection with the accompanying drawings, wherein—

Figure 1 is a view in perspective of a treadle constructed in accordance with my invention, and Fig. 2 is a transverse sectional view thereof on the line $x\ x$. Fig. 3 is a similar view to Fig. 2, and wherein the treadle is shown as constructed of a solid piece of rubber or other equivalent material.

There have been former inventions on this subject having in view like objects as the present, and among which may be mentioned one having bars located on opposite sides of a central working-bearing and arranged to turn to incline their upper or exposed faces toward each other, so as to conform to the tread of the foot, such bars having a filling or core of wood or like material incased or inclosed by an envolope of rubber. In this instance there is apt to be a turning of the parts constituting the treadle, offering the corners or angles of the rubber to the foot, instead of the flat surface thereof, and which, when the weight of the rider is applied, is apt to cause a slipping of the foot and result in a fall.

My invention differs from the one referred to in that it cannot turn, and is constructed on its working-surfaces of a shape to conform to the ball of the foot. Preferably I employ a core of wood or equivalent light material, having an envelope of rubber molded on its surfaces to the required shape; but instead of using a core I sometimes employ a simple solid piece of rubber or other equivalent material.

Reference being had to the several parts of the drawings by letters marked thereon, A represents, as a whole, a treadle for bicycles constructed in accordance with my improvements, the same having the ordinary end plates, $a\ a$, and provided at one end with devices for adjusting the treadle to the crank of the machine and at the other end the adjustment for the bearings; but it should be here stated that such features form no part of my present improvements, as such improvements relate entirely to the construction of the main body or bearing-surfaces.

B represents a core of wood or equivalent light material, having a central longitudinal opening for the passage therethrough of the spindle $b$ of the crank, and at each end a similar opening for the passage of the rivets $c\ c$, uniting the end plates, $a\ a$, in the manner usual in many forms of treadles. This core B is inclosed by an envelope, C, of rubber, dished or hollowed out on its tread-surfaces in such manner as to receive and conform to the ball of the foot, thus preventing by its shape accidents frequently incident to many former inventions on the subject.

As before stated, instead of employing the core of wood or other equivalent light material, as shown by Fig. 2, I sometimes construct the treadle of a single solid piece of rubber, or equivalent material, molded to the required shape, as seen in Fig. 3.

From the foregoing description it will be seen that when the rubber envelopes have become worn they can be quickly replaced by others, and it will further be seen that a treadle so constructed reduces the cost of manufacture to a minimum.

Having thus described my invention, what I claim as new, and desire to secure by Letters Patent, is—

1. A treadle for bicycles, having its exterior bearing-surfaces curved to conform to the ball of the foot, substantially as described.

2. A treadle for bicycles, consisting of a core of wood or equivalent light material inclosed in an envelope of rubber dished or hollowed out on its tread-surfaces to conform to the shape of the ball of the foot, substantially as described.

3. A treadle for bicycles, consisting of a core of wood or equivalent light material inclosed by an envelope of rubber dished or hollowed out on its tread-surfaces, the said core being formed with a central opening for the passage of the crank-spindle, and having at each end a like opening for the reception of the bolts *c c*, substantially as described.

In testimony whereof I have hereunto set my hand in the presence of two subscribing witnesses.

GIDEON HAYNES, Jr.

Witnesses:
C. H. COLMAN,
EDWARD J. JONES.